Aug. 6, 1935.  F. I. HISS  2,010,364
CONVERTER
Filed May 24, 1933   3 Sheets-Sheet 1
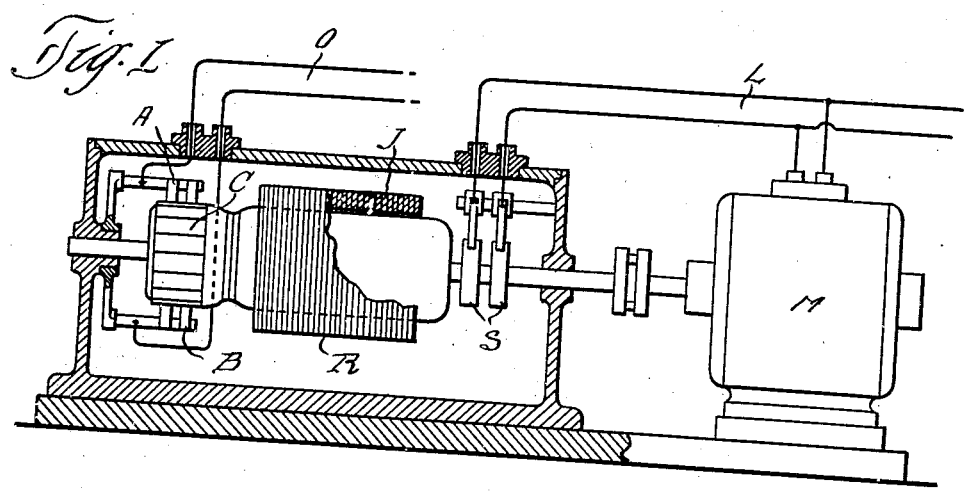
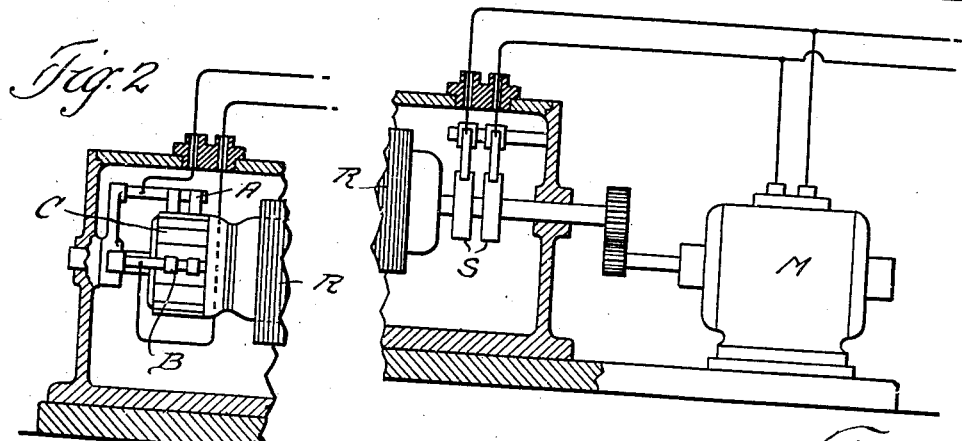
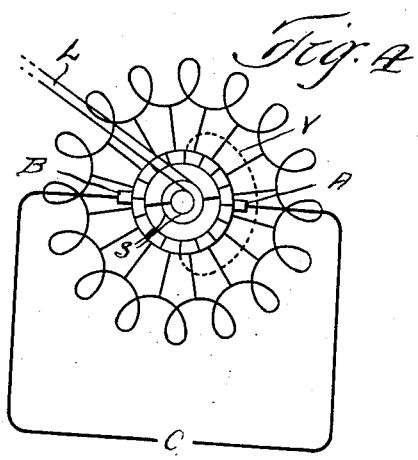
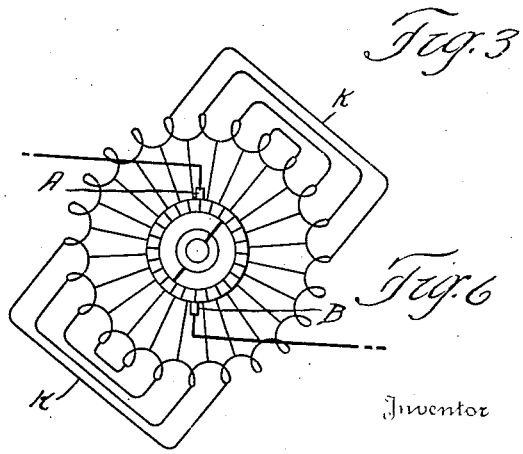
Inventor
Fielder I. Hiss
By Hull Brock & Wed
Attorney Aug. 6, 1935.    F. I. HISS    2,010,364
CONVERTER
Filed May 24, 1933    3 Sheets-Sheet 2
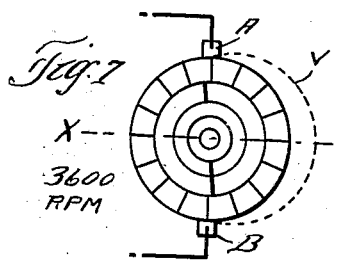
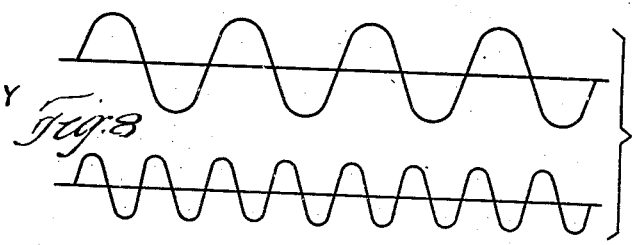
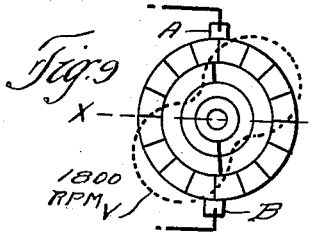
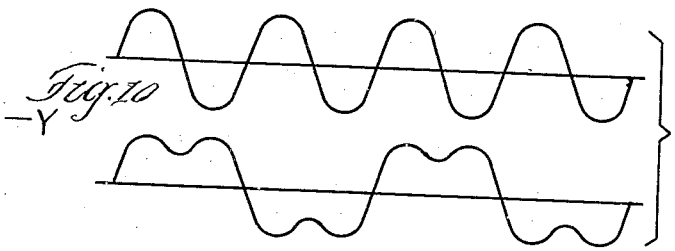
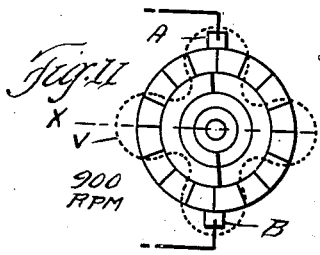
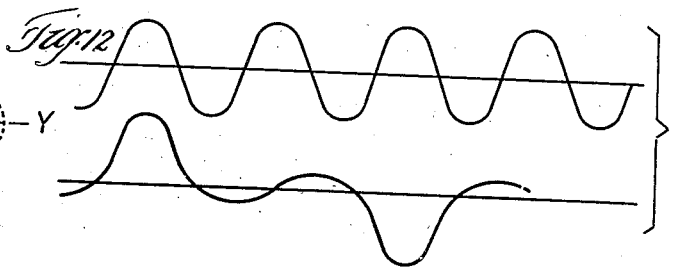
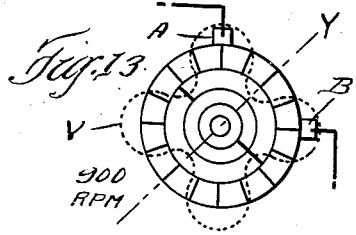
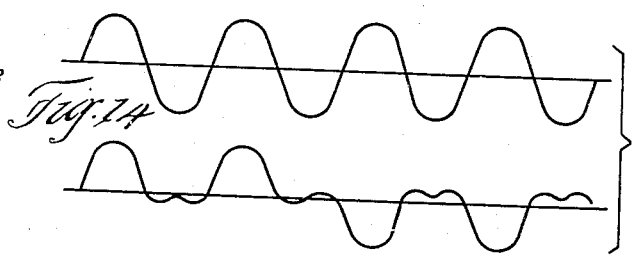
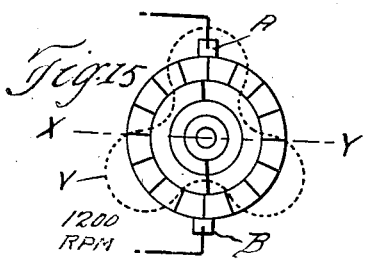
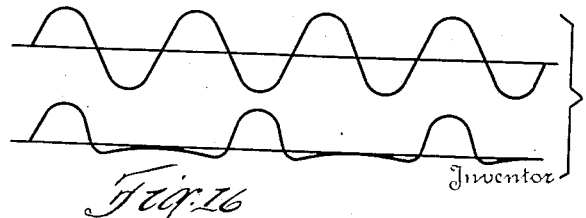

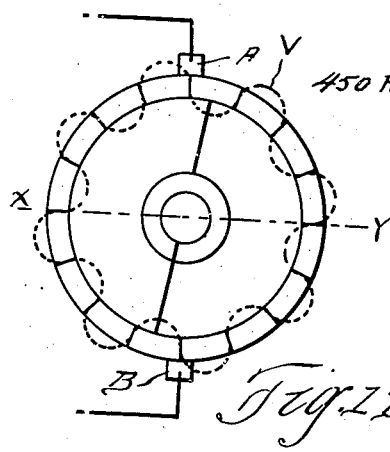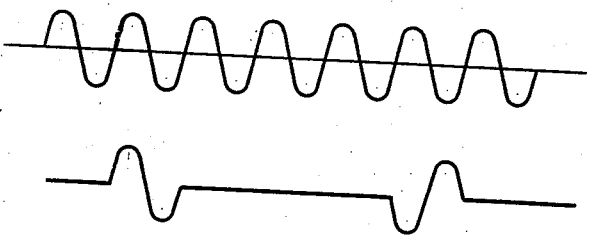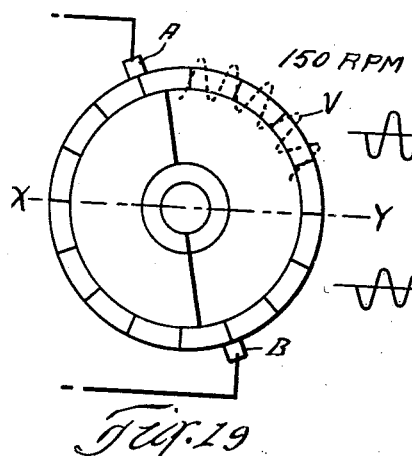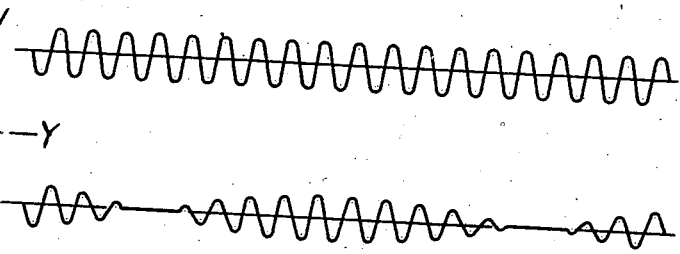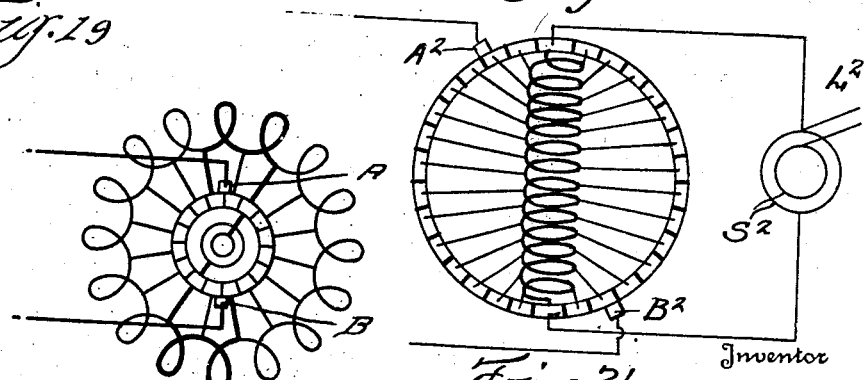

Patented Aug. 6, 1935

2,010,364

UNITED STATES PATENT OFFICE 2,010,364

CONVERTER

Fielder I. Hiss, Warren, Ohio

Application May 24, 1933, Serial No. 672,595

11 Claims. (Cl. 172—281)

My invention relates to improvements in the methods and means for changing the character of alternating electric currents, which in some aspects of the invention will effect the changing of frequencies and in another aspect will produce rectification of the currents so as to convert an alternating current into a uni-directional current of a pulsating character and in other cases the conversion of uniform alternating currents into intermittent or modulated alternating currents without making and breaking the continuity of the circuit.

In the accompanying drawings, Fig. 1 is a side elevation, partly in section, of the device which is used for carrying out my invention; Fig. 2 is an elevation of a portion of the same showing an alternative brush arrangement for the output circuit; Fig. 3 is a side elevation of the input circuit showing a modification in the method of driving the converting armature; Fig. 4 is a diagrammatic view illustrating the windings; Figs. 5 and 6 are similar views; Fig. 8 is a diagrammatic view of the input and output currents when the method of operation is as shown in Fig. 7. Similarly Figs. 10, 12, 14, 16, 18 and 20 are diagrammatic views of the input and output currents when the method of operation is as shown in Figs. 9, 11, 13, 15, 17 and 19. Fig. 21 is a schematic diagram of a modified form showing a single circuit winding.

In carrying out my invention, I make use of the principle of an electrical translating device which is a rotating armature drawing current of a given phase and frequency and will deliver currents of a different character when rotated in synchronism or a sub-multiple of synchronism with the alternating currents which are applied thereto.

Frequency changing has been effected to some extent by the use of such rotating armatures fed both with polyphase and single phase currents, by driving such an armature at speeds below synchronism, and utilizing the slip-frequency currents.

But I have discovered that by an alternative method, which does not use slip frequencies, it is possible to obtain advantages in operation when the rotating armature is fed with single phase current.

My invention comprises a method of changing the character of single phase currents by such rotating armatures when operated at synchronism and at speeds far removed from primary synchronism, obtaining definite wave forms in the output circuit, and, by the method to be described, elimination of the injurious effects of slip frequency harmonics; also, by the use of a particular type of equalized winding, completely eliminating the factors which have been the cause of poor commutation, and greatly enlarging the utility of such apparatus for various useful purposes, as hereinafter set forth.

I analyze in detail the operation of the machine under several specific conditions, but I do not confine my claim to operation under the specific conditions described, but intend to cover all cases employing, within the spirit of my invention, the novel method and apparatus.

In order to obtain proper results, when the armature is not operated at primary synchronism, and is operated below synchronism, it must be operated at a speed which gives an integral number of cycles or half cycles per revolution. Such speed I call a subsynchronous speed.

Referring to Fig. 1, R represents a two-pole drum-wound converter armature which is driven by a synchronous motor M and the same current which drives the motor is fed through two slip rings SS connected to diametrically opposite points of the armature winding which is provided with the usual commutator.

No fixed field structure is provided but instead a jacket of laminated iron J slipped over the armature is used to complete the magnetic circuit and revolves with the armature.

Supposing a 60 cycle single phase current is supplied to the motor which is driven synchronously at 3600 R. P. M., if this 60 cycle current is then supplied to the slip rings of the two-pole armature as shown, the device will act as a rectifier and will deliver through brushes A and B suitably placed on the commutator rectified current, that is, pulsating direct current.

Assuming the converting armature to be supplied with 60 cycle single phase current with the driving motor running synchronously at 3600 R. P. M., both the motor and the converting armature being fed from the same line, then in order to effect rectification of the alternating current into direct current, the brushes must be placed in such a position on the commutator that the incoming waves of the electro-motive force are reversed at the proper instant by the action of the commutator and the position of the brushes appropriate for rectification, I will call the neutral point.

I have discovered that if these brushes should be placed at 90° to this neutral position, then when the converting armature is rotated in synchronism with the incoming 60 cycle current, the action will result in changing of the frequencies of this incoming 60 cycle current and the delivered current will be of a frequency double that which is fed into the converting armature. In other words, the current fed from the 60 cycle line would be delivered from the output side of the device in approximate sinusoidal wave form at a frequency of 120 cycles.

If the armature should be driven by an adjustable speed motor so that it would fall below synchronism, then low frequency currents would be delivered from the armature. These are currents of slip frequency and the frequencies of the delivered current will increase as the speed is lowered from synchronism.

However, at these intermediate non-synchronous speeds, the actions which go on in the armature are very complicated, due to the interfering effect of harmonics of slip frequency, and these harmonics affect the commutation of the machine injuriously and prevent a pure wave form from being obtained and I do not therefore employ these intermediate speeds between submultiples of synchronism.

I have discovered that in avoiding these intermediate speeds and operating only at fractional synchronism or sub-synchronism, I obtain definite wave forms in addition to avoiding commutation troubles which have been experienced and recognized, and have prevented any extensive use of this type of converter for such purposes as I now set forth.

For instance, if such a converting armature is driven synchronously at 1800 R. P. M. or exactly one-half synchronous speed by a synchronous motor fed from the same source of supply that supplies the converter armature from the 60 cycle line, I will obtain a conversion from the 60 cycle line frequency to a current having exactly one-half the frequency or 30 cycles with good commutation.

If, however, the converter armature is driven at approximately 1800 R. P. M. only, that is, as near 1800 R. P. M. as can be obtained by driving the converter from an adjustable speed motor, or a belt, when the speed is adjusted as accurately as possible to 1800 R. P. M., while approximately 30 cycle current will be delivered from the machine, there will be superposed on the 30 cycle frequency a slip frequency harmonic which will show itself, for instance, on a lamp connected across the current as a slow flicker which may be of the frequency order of several seconds, depending upon the momentary variation of the speed from exact sub-synchronism.

Also, the commutation under such conditions will be injuriously affected and in any size except for small outputs the machine is practically inoperative due to the heavy sparking. However, when driven exactly at 1800 R. P. M. by a synchronous motor, this slip frequency harmonic disappears and the commutation becomes reasonably good in converters of small capacity.

If the device should be driven at 900 R. P. M., or one quarter synchronous speed, under the same conditions by a suitable synchronous motor, then from a line frequency of 60 cycles, 15 cycle current is obtained also with good commutation in converters of small capacity.

Further, if this converting armature is driven at 1200 R. P. M., or exactly one-third synchronous speed, from a synchronous motor fed from the same line, then rectified or direct current impulses are obtainable.

When the operating speed is lowered still further, as will be fully explained, that is below one quarter synchronism or 900 R. P. M. for a two-pole converter, the output delivered from the converter becomes a modulated wave train, all true frequency changing or rectifying action disappears, and both the input to the converter and the output from the converter become a series of regularly interrupted portions of a wave train bearing the impress of the line frequency.

As the actions which occur in such an armature when driven at any speed are essentially the actions of a commutator, the winding connecting the commutator bars can be regarded merely as an inductive shunt to the commutator, as the means of conveying the current fed into the slip rings to the commutator and to carry the magnetizing current and such actions as I have found to occur can be predetermined by analyzing the actions which occur in the commutator and windings, as commutator switching actions only.

Referring to Fig. 4, the armature winding is represented as a ring winding, this winding being electrically similar in its actions to a drum winding. The slip rings into which the 60 cycle single-phase current is fed from the line L are connected diametrically to the commutator bars. Now when driven at synchronism by a synchronous motor connected to the same line as the converter, it is obvious that the commutator will make one revolution per cycle of the input current and if the armature is rotated at 3600 R. P. M. by a directly coupled motor as shown in Fig. 1, a half cycle or one wave of the input voltage may be represented by the semicircle lettered V spaced half-way around the commutator.

Every position of the slip ring connections will correspond to a particular voltage. For instance, whenever the voltage is zero the slip ring connections will occupy one of two diametrically opposite positions in space.

Starting from either of these positions when the armature has moved through a certain angle A, then the voltage will have assumed a definite value, which is proportional to sin A, and thus to every point on the armature corresponds a particular voltage. Setting off these voltages radially from a circle of any diameter so that positive voltages lie outside the circle and negative voltages inside, we get a curve such as is shown dotted in Fig. 4. But the voltages shown by this curve are not the voltages across the commutator brushes. To understand this, imagine a constant-voltage E, for instance to be applied across the slip rings SS of Fig. 4. Then when the slip ring connections lie opposite the brushes, a voltage E will appear across them also. If, however, the slip ring connections make an angle B with the brushes, then to a first approximation the voltage across them will be E cos B.

When the slip ring connection and the brushes are at right angles, there will be no voltage across the brushes, no matter what the value of E, but when they coincide, the voltage across the brushes will be the voltage at the slip rings.

Thus the machine may be regarded as a rotating potentiometer, and the ratio of the voltage existing at any instant at the slip ring connection to the voltage delivered to the brushes I call the potentiometer ratio.

With the brushes A B placed diametrically on the commutator as shown in Fig. 4 and in relation to the input voltage as shown, the machine is a rectifier delivering pulsating direct current.

In this diagram, the brushes are in the neutral position, the position of the slip ring connections when the incoming voltage wave is a maximum coincides with the position of the brushes, and, therefore, practically line voltage is fed straight through to the output circuit. Now, when the commutator makes one-quarter of a revolution from this position, the voltage of the incoming waves will have dropped to zero as just pointed out and at this instant the input voltage reverses and during the next half of the revolution the reversed current is fed into the opposite brush.

Thus the machine acts as a rectifier giving pulsating direct current.

If now the brushes are moved around approximately 90° from this neutral position, it is found that the action is to double the frequency of the current and not to rectify.

In this position, the brushes are at right angles to the peak of the incoming waves of electromotive force as is shown in Fig. 7, where the winding of the armature is omitted from the diagram for simplicity. The slip ring connection in this case coincides with the line of the brushes when the line voltage is zero and no voltage will be delivered to the output circuit. Now, if the armature makes a quarter of a revolution, during this movement, voltage in one direction will have been delivered to the output circuit, but when the position X Y is reached by the slip ring connection, no voltage will exist in the output circuit because the connection has reached the equipotential position with respect to the brushes, though actually the voltage of the input wave is at its maximum. During the next quarter revolution, the direction of the input voltage is the same, but the connection now feeds through the opposite brush of the output circuit and thus the polarity of the output circuit is reversed and thus the one-half cycle of input voltage is delivered to the output circuit as a full cycle. This will continue uniformly when synchronous rotation is continued and thus 120 cycle current is delivered, but at reduced voltage as compared to the line voltage. Fig. 8 shows how the 60 cycle wave train is changed into a 120 cycle wave form.

Figs. 9 and 10 illustrate the action of the converter armature in changing the frequency from 60 cycle to 30 cycle. In this case, the converter armature is driven at a sub-synchronous speed of 1800 revolutions or just one-half of the synchronous speed of 3600 revolutions. This can be accomplished either by a synchronous motor operating at 1800 R. P. M. or by reducing the speed of the armature from the synchronous motor operating at 3600 R. P. M. by suitable positive reducing gearing.

In the diagram shown in Fig. 9, the windings will be connected to the commutator in the usual manner as previously described for a two-pole drum winding. The 60 cycle single phase current is fed from the line into the slip rings which are connected diametrically to the commutator. It is obvious that at 1800 revolutions of the commutator which is exactly one-half the synchronous speed of 3600 R. P. M. that during one revolution of the commutator two cycles of the primary frequency will occur in the armature winding. Brushes A and B are placed diametrically on the commutator from which the output current is obtained. When the commutator makes one revolution, which occurs during the interval of two cycles of the input current, it is clear that at the instant when the connection from the slip ring is coincident with the position of the brushes on the commutator as shown, that the line current will start to feed through the brushes into the output circuit as soon as the slip ring connection leaves the line of the brushes. When the position X Y is reached by the revolving connection, the brushes A and B will be in equipotential position with reference to the input voltage and at this instant the voltage reverses due to the potentiometer action already described. During the next quarter revolution, voltage will be delivered to the output circuit in the same direction, for although the direction of the incoming voltage has reversed, the potentiometer action of the device reverses the direction of this voltage as delivered to the output circuit. In the third quarter of the revolution, the voltage will be reversed through the output circuit because at this point of the reversal of the input voltage the diametrical connection is in line with the position of the brushes. In the fourth quarter of the revolution, potentiometer action again occurs as in the first quarter and the fourth wave of input voltage is therefore reversed with respect to the third and thus the 60 cycle input is translated into the wave form as shown in Fig. 10, which is 30 cycle current, though not a true sine wave.

In Fig. 11, I illustrate the action of the machine for changing the frequency from 60 cycle to 15 cycle. In this case, I rotate the armature at the sub-synchronous speed of 900 R. P. M. and in this case four cycles of the line frequency are fed into the armature during the single revolution thereof. Assuming rotation to start under the conditions shown, it is clear that when the armature turns in the direction of the arrows from this assumed position during the first one-eighth of a revolution that voltage in one direction will be delivered to the output circuit, but at the end of this first one-eighth revolution, the output reverses. Thus there will be a reversal of the voltage delivered to the output circuit, but the delivered voltage is of fractional value because the slip ring connection is approaching the equipotential position X Y with respect to the brushes where it can receive no voltage as already explained. Therefore, the second wave will be much suppressed with respect to the first wave delivered to the output circuit. Similarly the next or third wave will be even more suppressed due to the potentiometer action and the fourth wave will be partially suppressed. Now, when the diametrical connection reaches the fifth wave in continuing its rotation, current is delivered through the brushes A and B in the output circuit in the opposite direction to that of the starting position and thus the effective delivered current is one cycle of alternating current at a frequency of 15 cycles for the complete revolution because the sixth, seventh and eighth waves will be practically suppressed. The 15 cycle impulses are of an intermittent character, departing widely from a sine wave. This translating action is illustrated in Fig. 12.

If the brushes, however, are placed at 90° around the commutator instead of at 180°, as shown in Fig. 13, then the action will produce a less attenuated wave. This is because, instead of suppressing three waves of the incoming voltage out of the four, only one-half the waves are suppressed and thus the wave form shown in Fig. 14 is obtained which, though it departs widely from a sine wave, such 15 cycle current is quite applicable commercially, where wave form is not of importance.

The effective voltage of the output current is less than when the brushes are placed diametrically, but the k. v. a. output of the machine is not materially reduced and the operation is satisfactory.

In Fig. 15, I illustrate the action when driving the armature at the sub-synchronous speed of 1200 R. P. M. In this case, there are three cycles of input frequency during one revolution. It will be found that under these conditions the machine acts as a rectifier producing pulsating unidirectional currents.

Assume that the first wave is positive. This will be delivered through the output circuit, then, as the armature continues to turn, the second and third waves will be almost suppressed while the fourth wave being a negative wave will, through the potentiometer action, as before described, be delivered through the output circuit as voltage in the same direction as the first wave produced. Thus unidirectional currents result and their wave form is approximately as illustrated in Fig. 16 pulsating at 40 times a second.

When the operating speed is lowered still further, that is, below one quarter synchronism or 900 R. P. M., the waves delivered from the converter become modulated alternating currents and the production of these intermittent waves is also part of my invention.

In Fig. 17, I illustrate the action of the machine when driven at the sub-synchronous speed of 450 R. P. M.

In this case, there are 8 cycles of the input frequency per revolution and if the output brushes are placed diametrically across the commutator, a full cycle of input voltage will be fed into the output brushes twice in a revolution, that is, when the slip ring connection coincides with the line of brushes, and the resulting character of the output current will be as shown in Fig. 18, that is, a highly intermittent current, consisting of one active cycle followed by a dead period of three cycles.

It is understood that this is the current output under a loaded condition, for, at these low speeds of revolution, the shape of the output wave and particularly the output current is affected by the load.

The general shape and character of the output current waves has been checked by oscillographic records and has approximated the predicted shape of current and voltage waves.

As the speed of rotation is still further lowered, the output current and voltage due to the potentiometer effect of the rotating armature assumes the character of nodal waves, as an example of which I will assume the armature to rotate at 150 R. P. M.

At this speed, there are 24 cycles of input frequency (Fig. 19) per revolution and the output is the nodal wave train, as shown in Fig. 20.

At these low speeds of rotation, it is possible to operate at speeds between sub-synchronous speeds. But, under all conditions, sub-synchronous operation is highly desirable, both to get good commutation and to obtain regular wave forms.

My invention contemplates the use of the device when driven at synchronism under the conditions described and at any sub-synchronous speed or fractional synchronous speed down to very low speeds and the operation of the machine at any such speed can be approximately determined from a consideration of the actions occurring in the manner described at the synchronous and sub-synchronous speeds.

I have found that when a simple ring winding or an equivalent winding of the usual drum type is employed that in operation, when the output of the armature does not exceed a few kilowatts, that fair commutation is obtained without any departure in construction from these usual forms of winding, but, when the output is higher, sparking occurs at the brushes of such a character, even with the great improvement obtained by operating at sub-synchronous speeds as described, as to make the machine unreliable in commercial operation.

I have discovered means to overcome this difficulty and obtain good commutation in machines delivering up to several hundred kilowatts or more in the output circuit.

Referring to Fig. 5, in which single phase current is fed into the diametrical connection through slip rings from the line as shown, when the slip ring connection moves away from the brushes, the input current is drawn through the two parts of the winding adjacent to the slip ring connection on one side and as the armature revolves, these load currents in the winding alternate in position, first occurring on one side of the slip ring connection and then on the other, and these heavy currents shifting through the winding at a frequency depending upon the speed of revolution of the armature, produce flux disturbances which induce voltages in the armature coils adjacent to the diametrical connections which are injurious to commutation.

I have discovered that the addition of equalizing connections K K as shown in Fig. 6 eliminates these flux disturbances by equalizing the flow of the load currents on each side of the slip ring connections as the armature revolves, and it is necessary to use these equalizing connections or their equivalent in all converters of capacity exceeding a few kilowatts; in fact it is desirable to use these equalizing connections in converters of even the smallest sizes, and my invention contemplates the use of these equalizing connections in such a converter when operated under any conditions, at synchronism, or any speed below synchronism, for rectification, frequency changing and the other uses covered by this specification.

In a two-pole armature of the drum type or ring type, there are of course two circuits for the flow of the current through the armature and these equalizing connections which may connect every commutator bar on each side of the diametrical connection or every second bar or every third bar or even less, according to the conditions of design as dictated by experience, could be dispensed with as separate connections if an armature winding with a single circuit were to be employed.

An example of such a single circuit winding is shown schematically in Fig. 21, which as can be seen, comprises a single winding, from each turn of which two taps are carried off, and connected to successive commutator bars, on each side. The slip rings are connected to the ends of the single winding, and the brushes and slip rings as well as the line connections are indicated by the same letters applied to corresponding parts in Figs. 1 and 2 with the superscript 2 applied.

Such a single circuit winding tapped to a commutator in such a manner, is the electrical equivalent of a two circuit drum or ring winding, provided with equalizing connections, and the use of this winding with its tappings is within the spirit of my invention.

In many cases to fulfill specfic requirements, especially at low speeds, more brush sets than two can be placed on the commutator and in all such cases every additional brush set will furnish approximately the same character of current, but these different currents will be out of phase with respect to each other and thus two, three or more phases in the output circuit are obtainable and readily utilizable.

When additional brush sets are provided, the total output of the machines is increased, in the same way that a rotary converter operated three phase will give more output than a rotary converter operated single phase.

When operating with more brush sets than two, for instance, four or six sets, the current delivered must be used in separate electrically insulated circuits since the currents are out of phase and a displacement voltage will exist between them. In addition to utilizing the output of the machine from several sets of brushes, I also operate the machine with several such sets of brushes short circuited in separate circuits when the load is placed in series connection with the converter, as more fully described below, and the output is not taken directly from the commutator brushes.

When the converter is operated at synchronous and sub-synchronous speeds, the brush position has a definite effect as I have shown on the performance of the machine.

I therefore prefer to arrange the brushes so that they may be moved through a small angular shift or to adjust the locking position between the couplings.

This will be a permanent adjustment as the brush position will not need to be changed unless the coupling between the synchronous driving motor and the converter is changed and to this end the couplings will be marked so that the proper coupling position can be restored.

This brush adjustment or coupling adjustment is not in all cases necessary, but it is desirable if strictly theoretical performance is to be obtained.

By operating the converter at various sub-synchronous speeds, and with different brush positions, a selection of effects are obtainable. I have shown that lower and higher frequencies than the frequency delivered to the machine can be obtained and there are a number of other possible combinations which come within the scope of my invention.

When fed with 60 cycle current, I have shown that I can obtain frequencies of 15, 30 and 120 cycles, and by a suitable use of the principles set forth, intermediate frequencies or pulsating unidirectional currents can be obtained at sub-synchronous speeds other than the cases which I have analyzed in detail.

Also it is understood that while 60 cycle supply is assumed throughout in the text of this specification, other supply frequencies or special frequencies can be used without prejudice to the principles of operation set forth.

It is well known that for a given voltage input the number of commutator bars which should be provided is in proportion to the number of poles and the two-pole design allows such an armature with a minimum number of commutator bars, while at the same time by running at speeds at a fraction or primary synchronism in may cases, I obtain all the advantages of low operating velocities of armature and commutator.

It is not my intention, however, to limit my invention to two-pole wound armatures.

In the case of machines of large capacity or to satisfy particular conditions, it may be desirable to employ armatures wound for four, six or more poles, in which case the synchronous or sub-synchronous speed will be reduced in exact proportion to the increase in the number of poles. I provide the machines with a sufficient number of commutator bars to reduce the transformer voltage which exists between the commutator bars to a value which, as is well known in the art, will not cause undue sparking or excessive short circuit current under the brushes and preferably without employing any auxiliary devices, such as commutator resistance leads.

I preferably choose a number of commutator bars to limit the maximum transformer voltage between the commutator bars to a value of the order of two to three volts when carbon brushes are employed.

When this condition of design is fulfilled in conjunction with the elimination of harmonics and the elimination of the injurious shifting fluxes by the use of equalizing connections, the commutation problem is solved. In the type of machine described, a single armature winding is used and when so provided, it is preferable to operate at not exceeding 220 volts supply from the line. However, the converter can be arranged to operate in particular cases at higher voltages than 220 by suitable design or by employing a double armature winding, that is, to supply the line voltage to a winding in the same slots but not electrically connected to a low voltage winding, and the output winding only in this case is connected to the commutator. It is to be understood that in a rotary transformer such as described, it is necessary to proportion the machine according to ordinary practice in transformer design; that is, the winding is figured to give normal flux densities, in the various parts of the magnetic circuit, so that the magnetizing current will be kept at a low value at the particular operating voltage used. The same electrical effects may be approximated by other mechanical means of effecting relative motion between the brushes and the commutator and such constructions though not preferred, are within the spirit of my invention.

The method and apparatus herein described is applicable for delivering unidirectional current, for the purpose of frequency conversion, and for the production of intermittent or modulated alternating currents.

When used as a rectifier at synchronism, for all such purposes for which full wave rectifying equipment can be applied and where pulsating direct current is not disadvantageous, my machine has the advantage over motor generator sets of being much lighter and cheaper and can readily be designed for large output at voltages not exceeding about 220 volts.

When used for frequency conversion, it has the advantage over motor alternators or induction motors driven above or below synchronism, that the apparatus is smaller, lighter and cheaper.

For many purposes for which a change in the line frequency is desired, my apparatus can be used to advantage, such as driving 120 cycle motors for high speed drills, etc., where the line frequency of say 60 cycles does not permit of a speed higher than 3600 R. P. M. with a two-pole motor and where a synchronous speed of 7200 R. P. M. is obtainable with 120 cycles.

Other uses requiring lower frequencies, such as 30 cycles or 15 cycles, and to which my machine can be applied is the operation of electric hammers of the reciprocating type employing solenoidal coils and a free moving plunger.

These hammers require for their operation interrupted current impulses in separate circuits, there being a phase displacement between the impulses in the separate circuits.

I have shown how I can operate my converter to produce such currents and I can operate such hammers effectively with the out-of-phase current impulses secured by passing line current through my machine and without the use of the rectifying equipment which has previously been employed. When operated at 900 R. P. M. to convert line frequency of 60 cycles to 15 cycles current, my machine can be used for the operation of vibrating sifting screens and kindred vibratory devices.

For such purposes, the fact that when furnishing these low frequencies my machine does not give true sine waves is not a practical disadvantage, the desideratum being low cost, low weight, and portability of the frequency changers.

For the intermittent or modulated currents furnished by the machine over a wide range of operating speeds an important use has been found in resistance welding operations.

For many years such intermittent currents have been used for the lap and butt welding of metal sheets, the material to be electrically welded together being run through copper or alloy rolls which are connected to the secondary winding of a transformer furnishing low voltage high amperage current.

It has been found that by interrupting the current in the primary or high voltage winding of the welding transformer and using the interrupted currents in the low voltage secondary winding to produce a series of spot welds, which for continuous seam welding will overlap, that troubles experienced in burning the material to be welded and destruction of the welding rolls are largely eliminated.

When used for the control of such seam and butt welding operations, the converter, or "modulator" as it may be called when used for such purposes, may be connected to the welding transformer in two ways.

Referring to Fig. 1, the line current may be fed into the slip rings S S and the modulated currents taken from the brushes A B to the primary of the welding transformer, or the commutator brushes A B may be short circuited, and the primary of the welding transformer may be inserted in series with the line.

When used for modulating the line supply for such resistance welding operations, I find it frequently most convenient to connect the primary of the welding transformer in series with the line and to short circuit the brushes which are diametrically placed on the commutator of the modulator.

For in many welding operations, it is not necessary that the voltage across the primary of the welding transformer be reduced to zero, but if the voltage across the welding transformer be reduced to one-half or one-quarter of normal, sufficiently good control of the welding current is obtained.

Operated thus, the modulator does not have to absorb the whole line voltage but only say 50%–75% and a modulator wound for say 300–350 volts can efficiently control the input from a 440 volt line.

Also, more brushes can be placed on the commutator of the modulator when operated thus, and as the output of the modulator is as much governed by the carrying capacity of the brushes as by the carrying capacity of the winding, the output of the modulator can thus be increased by adding more brush sets.

These added brush sets are placed on the commutator close to the first set of diametrically placed brushes A B.

Thus I add a second set of diametrically placed brushes or a third set, arranged diametrically on the commutator—but displaced from A B by a small angle, say 5°–15° on each side of A B, just sufficient to allow for mechanical clearance between the brush sets.

Each set of diametrically placed brushes is then short circuited on itself.

It is understood that neighboring brush sets on the commutator cannot be interconnected as a displacement voltage exists between them.

As previously explained, also as in the prior art, there is no conversion of energy taking place in this machine, all the actions described are translating actions. The synchronous driving member which may be operated single phase or polyphase merely has to supply mechanical energy to overcome the frictional resistance of the converter armature, hence the load on the driving motor is constant, regardless of what load may exist on the converter. There is thus no conversion of electrical energy into mechanical energy and mechanical energy back to electrical energy, such as occurs in motor-generator sets and slip ring induction machines operated at over or under synchronism for frequency conversion.

Having thus described my invention, what I claim is:

1. In a frequency converter, in combination, a rotating transformer of the type having a wound rotor provided with slip rings and commutator, the slip rings being connected to the winding by equidistantly circumferentially spaced taps, unexcited means associated with said rotor for completion of the magnetic circuit, a synchronous motor mechanically connected in driving relation to said rotating transformer, a source of single phase alternating current, means connecting said motor and said slip rings to said source and brushes corresponding to said taps and riding on said commutator and positioned to register with said taps at the positions occupied by the rotating transformer when the rotor of said motor occupies the position which it occupies at zero voltage points of each cycle of said source.

2. A method of changing the frequency of a single phase alternating current which consists in commutating said current through a synchronously varying impedance, said impedance varying from substantially zero at the zero voltage points of each cycle to a maximum at the maximum voltage points thereof and back to zero during each half cycle of said current.

3. In combination, a rotating transformer of the type having a wound rotor provided with slip rings and commutator, unexcited means associated with said rotor for completion of the magnetic circuit, a synchronous motor mechanically connected in driving relation to said rotating transformer, a source of single phase alternating current and means connecting said motor and said slip rings to said source, the rotational speed ratio of said motor and rotating transformer being constant and the number of electrical cycles through which said motor passes being a simple multiple of the number of electrical cycles through which said rotating transformer passes.

4. In combination, a rotating transformer of the type having a wound rotor provided with slip rings and commutator, unexcited means associated with said rotor for completion of the magnetic circuit, a synchronous motor mechanically connected in driving relation to said rotating transformer, a source of single phase alternating current and means connecting said motor and said slip rings to said source, the rotational speed ratio of said motor and rotating transformer being constant and the number of electrical cycles through which said motor passes being a simple multiple of the number of electrical cycles through which said rotating transformer passes, said rotating transformer including continuous windings and one or more equalizing connections connected to said winding in balancing relation about the points of connection of said slip rings thereto.

5. In combination, a rotating transformer of the type having a wound rotor provided with slip rings and commutator, unexcited means associated with said rotor for completion of the magnetic circuit, a synchronous motor mechanically connected in driving relation to said rotating transformer, a source of single phase alternating current and means connecting said motor and said slip rings to said source, said armature being provided with one or more low resistance equalizing connections between portions of the winding on opposite sides of the point of connection of each slip ring thereto, the ends of each of said equalizing connections being connected at approximately the same distance from the point of connection of a slip ring to the winding.

6. In combination, a rotating transformer of the type having a wound rotor provided with slip rings and commutator, unexcited means associated with said rotor for completion of the magnetic circuit, a synchronous motor mechanically connected in driving relation to said rotating transformer, a source of single phase alternating current and means connecting said motor and said slip rings to said source, said armature being provided with a plurality of low resistance equalizing connections between portions of the winding on opposite sides of the point of connection of each slip ring thereto, the ends of each of said equalizing connections being connected at approximately the same distance from the point of connection of a slip ring to the winding.

7. A method of changing the character of an alternating current supplied to a potentiometric controlling device, said method consisting in producing a uniform cyclic variation of the potentiometer ratio between an input circuit and another circuit electrically coupled with same whereby to obtain non-sinusoidal current waves whose fundamentals have the same fraction of the primary frequency as the speed is of synchronous speed.

8. In combination, a rotating transformer of the type having a wound rotor provided with slip rings and commutator, unexcited means associated with said rotor for completion of the magnetic circuit, a synchronous motor mechanically connected in driving relation to said rotating transformer, a source of single phase alternating current and means connecting said motor and said slip rings to said source, the rotational speed ratio of said motor and rotating transformer being constant and the number of electrical cycles through which said motor rotates being a simple multiple of the number of electrical cycles through which said rotating transformer rotates, and a plurality of pairs of brushes riding on said commutator and supplying separate output circuits.

9. In combination, a rotating transformer of the type having a wound rotor provided with slip rings and commutator, unexcited means associated with said rotor for completion of the magnetic circuit, a source of single phase alternating current and means connecting said slip rings to said source, said armature being provided with one or more low resistance equalizing connections between portions of the winding on opposite sides of the point of connection of each slip ring thereto, the ends of each of said equalizing connections being connected at approximately the same distance from the point of connection of a slip ring to the winding, and means for causing said rotating transformer to rotate through a number of electrical cycles per second less than one fourth the frequency of said current source.

10. In combination, a rotating transformer of the type having a wound rotor provided with slip rings and commutator, unexcited means associated with said rotor for completion of the magnetic circuit, a synchronous motor mechanically connected in driving relation to said rotating transformer, a source of single phase alternating current and means connecting said motor and said slip rings to said source, the rotational speed ratio of said motor and rotating transformer being constant and the number of electrical cycles through which said motor rotates being a simple multiple of from two to four inclusive of the number of electrical cycles through which said rotating transformer rotates.

11. In combination, a rotating transformer of the type having a wound rotor provided with slip rings and commutator, unexcited means associated with said rotor for completion of the magnetic circuit, a source of single phase alternating current and means connecting said slip rings to said source, said armature being provided with one or more low resistance equalizing connections between portions of the winding on opposite sides of the point of connection of each slip ring thereto, the ends of each of said equalizing connections being connected at approximately the same distance from the point of connection of a slip ring to the winding.

FIELDER I. HISS.